United States Patent Office 3,073,856
Patented Jan. 15, 1963

3,073,856
PREPARATION OF ORGANIC SILICON COMPOUNDS
Douglas Peter Dodgson, Newport, England, assignor to Monsanto Chemicals Limited, London, England, a British company
No Drawing. Filed July 30, 1957, Ser. No. 675,012
Claims priority, application Great Britain July 31, 1956
8 Claims. (Cl. 260—448.8)

This invention relates to the preparation of organic silicon compounds.

Silicon tetrachloride readily reacts with ethyl alcohol with replacement of the chlorine atoms by ethoxy groups, and this reaction is used commercially for the manufacture of tetraethyl orthosilicate.

$$SiCl_4 + 4EtOH \rightarrow Si(OEt)_4 + 4HCl$$

Other organic hydroxyl compounds, for instance higher alcohols, phenols and cresols, react in the same way, given rise to the corresponding silicon esters. The reaction proceeds in good yield, and by-products are negligible.

It has now been discovered that if the reaction is carried out in the presence of a solvent capable of ionising silicon tetrachloride such as dimethylformamide it pursues a different course, and results in products of a different nature. It has been found that although the same reaction occurs to some extent, a second reaction also occurs. In this second reaction chlorine atoms are replaced by hydroxyl groups and ethyl chloride is produced as byproduct.

$$\equiv SiCl + EtOH \rightarrow \equiv SiOH + EtCl$$

The hydroxyl groups of the silanol formed are reactive and tend to condense with one another with elimination of water and formation of siloxane linkages and probably also condense with more chlorosilane or with ethoxysilanes formed by the first reaction, so that there is a complex series of subsequent reactions.

$$\equiv SiOH + HOSi \equiv \rightarrow \equiv Si-O-Si \equiv + H_2O$$
$$\equiv SiOH + EtOSi \equiv \rightarrow \equiv Si-O-Si \equiv + EtOH$$
$$\equiv SiOH + ClSi \equiv \rightarrow \equiv Si-O-Si \equiv + HCl$$

The ethyl alcohol and water liberated can then take a further part in reaction, the former being available for the first reaction, and the latter forming siloxanes by hydrolysis of chlorosilane or ethoxysilane. The final products are thus condensed ethoxy siloxanes (or ethyl polysilicates) instead of ethyl orthosilicate.

Other alcohols and phenols react in a similar manner, and it is thus possible to produce condensed siloxanes by the reaction of silicon tetrachloride with alcohols and phenols containing no water, while hitherto the formation of condensed materials has required the presence of both alcohol and water. As the mechanism of the reaction when alcohol and say dimethylformamide are used is different from that when alcohol and water are used, the products naturally have somewhat different properties.

For instance a condensed ethoxy siloxane obtained from silicon tetrachloride and pure ethyl alcohol by a process of the invention does in general tend to have a better stability and a lower viscosity than a material of the same $SiO_2$ content obtained from silicon tetrachloride and aqueous ethyl alcohol. The lower viscosity is useful in certain applications, for instance in hydraulic and other functional fluids.

It is believed that silicon tetrachloride forms a complex with a dialkylformamide such as dimethylformamide in which several molecules of the latter are present for each of the former and that this influences the course of the reaction. Analogous complexes are also formed by dimethylformamide with a wide variety of substituted silicon halides, and as these complexes also influence the behaviour of the SiCl group towards alcohols and phenols in such a way that SiOH groups are formed and organic halides liberated, this enables the production by analogous reaction of organopolysiloxanes or silicones. Not all substituted silicon halides form these complexes, but those which do can easily be recognised by their behaviour towards dimethylformamide: the complex is partially ionised in the dimethylformamide solution and the solution thus conducts electricity, and also in many instances the complex can be separated from free dimethylformamide by simple distillation of the latter.

A process of the invention is one for the preparation of a silanol, in which a silicon halide capable of ionisation in a dialkylformamide is treated with an organic hydroxyl compound in the presence of a dialkylformamide solvent.

Moreover, as has been explained above, the hydroxyl groups of the silanol can condense together to give a condensed siloxane containing the siloxane linkage Si—O—Si. The detailed structure of the condensed siloxane largely depends of course on the particular silicon halide employed as starting material. For instance if the hydroxyl compound is ethyl alcohol and the silicon halide is silicon tetrachloride (the material chosen by way of example in the preceding description) or an ethoxychlorosilane the final siloxane will be a condensed ethoxy siloxane, actually an ethyl polysilicate. If however the silicon halide is for instance dimethyldichlorosilane a condensed siloxane is obtained which contains Si—Me leakages and is therefore essentially an organopolysiloxane, that is a silicone.

As the ionising solvent dimethylformamide gives excellent results and is the preferred solvent, although if desired other suitable homologues can be used, for instance diethylformamide.

In practice the silicon halides used are normally chlorides, and suitable ones are silicon tetrachloride itself as well as silicon chlorides containing groups as substituents on the silicon atom, that is to say chlorosilanes. The substituent groups can be organo groups, for instance alkyl groups such as methyl, ethyl or propyl or aryl groups such as phenyl, or organo-oxy groups, for instance alkoxy groups such as methoxy, ethoxy or propoxy or aryloxy groups such as phenoxy. Specific examples of substituted chlorosilanes are methyltrichlorosilane, dimethyldichlorosilane, diphenyldichlorosilane, triphenylchlorosilane, diethoxydichlorosilane and triethoxychlorosilane.

Suitable organic hydroxyl compounds are aliphatic alcohols such as ethyl, propyl, and butyl alcohols, and phenols, for example phenol itself, cresols and xylenols. Such hydroxyl compounds may be substituted by other groups, provided of course they do not interfere with the reaction.

It is preferable to use a substantial excess of the dialkylformamide, and the optimum quantity will vary according to the silicon halide used. Where silicon tetrachloride and dimethylformamide are employed, more than 4 molecular proportions of dimethylformamide to one of silicon tetrachloride is preferable. As hydrogen chloride given off during the reaction destroys the dimethylformamide, breaking a proportion of it down to dimethylamine hydrochloride and giving rise to formates of the alcohol used, these are preferably recovered for reconversion to the dimethylformamide starting material.

The reactants and solvent can be mixed in any order, but excellent results are obtained if the silicon halide and the dialkylformamide are mixed so that the silicon halide can ionise and then the organic hydroxyl compound is added.

*Example 1*

Silicon tetrachloride (17 g.; 0.1 mole) was added to dimethylformamide (73 g.; 1 mole) and the slurry was stirred for 4 hours at room temperature. Excess dimethylformamide was distilled off from the resulting complex at a pressure of 0.1 mm. Hg, the maximum temperature applied being 60° C. The residual complex (45.1 g.) contained, combined with the silicon tetrachloride introduced, dimethylformamide (27.7 g.; 0.38 mole).

To the complex was added ethanol (40 g.; 0.87 mole) and the solution was fractionally disitlled, first at atmospheric pressure and then at reduced pressure, at a maximum bath temperature of 100° C., giving ethyl chloride (>1 g..;>0.02 mole), ethyl formate (>13 g.;>0.175 mole), ethanol (20 g.; 0.44 mole) and dimethylformamide (11 g.; 0.15 mole) and leaving a residue (26.7 g.). The residue was extracted with ether; the residue from the extraction was dimethylamine hydrochloride (17.5 g.; 0.21 mole). Removal of the ether from the extract gave an ethyl polysilicate composition (8.1 g.). Examination of this composition by distillation resulted in an ethyl polysilicate fraction (4.25 g.), B.P. 120–200° C./0.2 mm., $n_D^{20}$ 1.403 and containing an equivalent of 43% $SiO_2$; a second fraction (1.85 g.), B.P. 200–300° C./0.2 mm., and an undistillable residue.

*Example 2*

To dimethylformamide (7.3 g.; 0.1 mole) was added with stirring silicon tetrachloride (4.25 g.; 0.025 mole), followed by ethanol (9.2 g.; 0.2 mole). After addition was complete, the product was distilled at atmospheric pressure, giving a distillate (6.15 g.) which was identified as a solution of ethyl chloride in ethyl formate. Further distillation of the residue at a reduced pressure of 0.2 mm. with a bath temperature up to 100° C. gave a second distillate (5.8 g.) from which was isolated ethanol (3 g.) and dimethylformamide (2.1 g.) The final residue (8.2 g.) was resolved by ether extraction into the ether-insoluble dimethylamine hydrochloride (5.85 g.) and an ether-soluble ethyl polysilicate (1.85 g.) which by analysis was shown to contain the equivalent of 56% $SiO_2$. The product was a stable liquid, which even after six months showed no signs of deposition of silica.

*Example 3*

To dimethylformamide (73 g.; 1 mole) contained in a three-necked flask equipped with a dropping funnel, stirrer and reflux condenser was added silicon tetrachloride (42.5 g.; 0.25 mole), the contents of the flask being continuously stirred. At the beginning of the addition the dimethylformamide was maintained below 40° C., the silicon tetrachloride being added slowly, but when a slurry was formed which showed signs of solidifying the temperature was allowed to rise and the silicon tetrachloride added more rapidly; at the end of the addition the slurry had become almost solid. Ethanol (92 g.; 2 moles) was then added while the contents of the flask were agitated; as the ethanol was added, the solids in the slurry slowly dissolved and eventually a two-phase liquid product was obtained.

This product was then distilled at reduced pressure and the fractions obtained were ethyl chloride (6.9 g.), a mixture of ethyl chloride and ethyl formate (10.1 g.) and a mixture of ethyl formate and ethanol (52.9 g.). The residue (121.3 g.) which was semi-solid was extracted with sodium-dried ether and the insoluble fraction (49.5 g.) consisting chiefly of dimethylamine hydrochloride was removed. The ether extract was distilled at a pressure of 13 mm. of mercury with a maximum temperature of 180° C. to remove ether, ethanol and any other volatile products, leaving a pale amber viscous liquid (23.9 g.). This liquid was redissolved in dry ether, filtered and the ether removed under reduced pressure.

The resulting product was an ethyl polysilicate in the form of a clear amber viscous liquid which by analysis was shown to contain the equivalent of about 55% $SiO_2$. The polysilicate had a viscosity of 240 cs. at 25° C., a specific gravity at 25° C. of 1.229 and a refractive index at 25° C. of 1.4137.

*Example 4*

This example describes the reaction of ethanol with methyltrichlorosilane.

Methyltrichlorosilane (3.73 g.; 0.025 mole) was added to dimethylformamide (7.3 g.; 0.1 mole), the mass being agitated throughout the addition. To the resulting white slurry there was then gradually added ethanol (8.1 g.; 0.175 mole), with agitation.

The product was fractionally distilled at atmospheric pressure up to a temperature of 100° C. to give ethyl chloride (1.31 g.; 0.02 mole) and ethyl formate (3.97 g.; 0.06 mole). The residue in the distillation flask was heated to 100° C. at 15 mm. to remove volatile materials, and then was extracted with ether to give an ether-insoluble fraction that was mainly dimethylamine hydrochloride (4.1 g.), and an ether-soluble fraction (8.1 g.).

The ether-soluble fraction was a high-boiling liquid condensed siloxane containing S—Me linkages and Si—OEt linkages, and was essentially a condensed ethoxy siloxane containing some Si—Me linkages.

*Example 5*

This example describes the reaction of ethanol with dimethyldichlorosilane.

Dimethyldichlorosilane (3.2 g.; 0.025 mole) was added with agitation to dimethylformamide (7.3 g.; 0.1 mole) to give a clear solution, there being a slight evolution of heat during the addition. Ethanol (6.9 g.; 0.15 mole) was added gradually with agitation to this solution.

The resulting liquid product was fractionally distilled at atmospheric pressure to give ethyl chloride (0.4 g.; 0.006 mole) and ethyl formate (2.75 g.; 0.037 mole) and then heated at 15 mm. pressure and 100° C. to remove traces of volatile materials. The residue was extracted with ether to give an insoluble fraction that was dimethylamine hydrochloride (3.05 g.; 0.38 mole) and an ether-soluble fraction (6.9 g.).

The ether-soluble fraction was a high-boiling condensed siloxane having a higher ratio of Si—Me linkages to Si—OEt linkages than the product of Example 4, and it did therefore have more of the characteristics of a silicone than a polysilicate.

What I claim is:

1. The method of preparing polysiloxanes by heating in dialkyl formamide solution a halosilane having the structure:

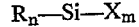

$$R_n\text{—Si—}X_m$$

wherein R is an alkyl radical, wherein X is a halogen atom, $n$ is an integer from zero (0) to three (3), $m$ is an integer from one (1) to four (4), and the sum of $n$ and $m$ is always four (4), with an alkyl alcohol of the group consisting of ethyl alcohol, n-propyl alcohol and n-butyl alcohol.

2. The method of preparing a polysiloxane which comprises heating a silicon tetrachloride with ethyl alcohol in dimethyl formamide solution.

3. The method of preparing a polysiloxane which comprises heating a trialkylchlorosilane with ethyl alcohol in dimethyl formamide solution.

4. The method of preparing a polysiloxane which comprises heating a dialkyldichlorosilane with ethyl alcohol in dimethyl formamide solution.

5. The method of preparing a polysiloxane which comprises heating an alkyltrichlorosilane with ethyl alcohol in dimethyl formamide solution.

6. The method of preparing a polysiloxane which comprises heating a trimethylchlorosilane with ethyl alcohol in dimethylformamide solution.

7. The method of preparing a polysiloxane which comprises heating a dimethyldichlorosilane with ethyl alcohol in dimethyl formamide solution.

8. The method of preparing a polysiloxane which comprises heating a methyltrichlorosilane with ethyl alcohol in dimethyl formamide solution.

References Cited in the file of this patent

UNITED STATES PATENTS

| | | |
|---|---|---|
| 2,521,673 | Britton et al. | Sept. 12, 1950 |
| 2,529,956 | Myles et al. | Nov. 14, 1950 |
| 2,556,897 | Bidaud | June 12, 1951 |
| 2,634,284 | Hyde | Apr. 7, 1953 |

OTHER REFERENCES

Rochow et al.: "Jour. Am. Chem. Soc.", vol. 76 (1954), pp. 4852–5.